United States Patent
Chen

(10) Patent No.: US 12,123,142 B2
(45) Date of Patent: Oct. 22, 2024

(54) PREPARATION METHOD OF TEA RESIDUE FIBER RAW MATERIALS AND APPLICATION THEREOF

(71) Applicant: ZENCE OBJECT TECHNOLOGY (SHENZHEN) CO., LTD., Shenzhen (CN)

(72) Inventor: Pengji Chen, Shenzhen (CN)

( * ) Notice: Subject to any disclaimer, the term of this patent is extended or adjusted under 35 U.S.C. 154(b) by 0 days.

(21) Appl. No.: 18/138,594

(22) Filed: Apr. 24, 2023

(65) Prior Publication Data
US 2024/0018722 A1    Jan. 18, 2024

(30) Foreign Application Priority Data
Jul. 14, 2022 (CN) .......................... 202210823331.X

(51) Int. Cl.
| | |
|---|---|
| *D21H 11/12* | (2006.01) |
| *D21B 1/02* | (2006.01) |
| *D21B 1/06* | (2006.01) |
| *D21H 17/00* | (2006.01) |
| *D21H 17/22* | (2006.01) |
| *D21H 17/26* | (2006.01) |
| *D21H 17/28* | (2006.01) |
| *D21H 17/30* | (2006.01) |
| *D21H 17/48* | (2006.01) |

(52) U.S. Cl.
CPC ............ *D21H 11/12* (2013.01); *D21B 1/021* (2013.01); *D21B 1/063* (2013.01); *D21H 17/22* (2013.01); *D21H 17/26* (2013.01); *D21H 17/28* (2013.01); *D21H 17/30* (2013.01); *D21H 17/48* (2013.01); *D21H 17/72* (2013.01)

(58) Field of Classification Search
CPC .............................. D21H 11/12; D21H 17/30
USPC ........................................................... 162/99
See application file for complete search history.

(56) References Cited

U.S. PATENT DOCUMENTS 7,927,460 B2 *   4/2011   Sato ....................... D21H 27/00
                                                          162/99

FOREIGN PATENT DOCUMENTS

| CN | 103717803 A | * | 4/2014 | ............... A24D 1/02 |
| CN | 106758443 A | * | 5/2017 | ............... D21B 1/02 |

OTHER PUBLICATIONS

English abstract of CN 107712121 A, Feb. 23, 2018 (Year: 2018).*

* cited by examiner

*Primary Examiner* — Anthony Calandra
(74) *Attorney, Agent, or Firm* — Ying-Ting Chen

(57) ABSTRACT

A preparation method of tea residue fiber raw materials includes steps of (1) sun-drying tea residues, crushing the sun dried tea residues, and treating them with concentrated hydrochloric acid and a strong base in succession; (2) extracting water from the treated tea residues to obtain tea polyphenols and pulp respectively, cooking the pulp, and then pressing and dehydrating it to obtain coarse pulp; (3) sequentially grinding and sieving the pulp, and beating it; and (4) adding β-cyclodextrin, carboxymethylcellulose sodium, and reinforced starch after the beating, adjusting the pH to 7-8, diluting, adding the tea polyphenols obtained in the second step, stirring uniformly, pressing and dehydrating, and drying to obtain the tea residue fiber raw material.

2 Claims, No Drawings

PREPARATION METHOD OF TEA RESIDUE FIBER RAW MATERIALS AND APPLICATION THEREOF

FIELD OF THE INVENTION

The invention relates to the field of papermaking, in particular to a preparation method of tea residue fiber raw materials for papermaking and its application.

BACKGROUND OF THE INVENTION

China's papermaking fiber resources are relatively scarce, and the capacity of supply is insufficient to meet the needs of expansion. As such, the availability of fiber raw materials has become a bottleneck for the development of the papermaking industry in China. Currently, waste paper pulp is a main raw material used for papermaking in China. However, yet it has certain shortcomings, such as an uneven fiber length, instability in chemical components, and a high residual volume of ink, which impose certain restrictions on its utilization. For instance, it is difficult to produce high-grade paper, high value-added special paper, and other paper products using 100% waste paper pulp. Furthermore, the resources of waste paper are not inexhaustible, and the rate of recycling has nearly reached its limit. Consequently, there is an urgent need to develop new papermaking raw materials to address the shortage of the papermaking fiber raw materials.

China is an agriculturally abundant country, producing a plentiful supply of tea biomass each year. However, the prevailing methods of treating tea residues are still largely limited to incineration. When the tea residues are discharged into a river, a substantial amount of organic matter is released into the water body, leading to a high concentration of organic matter and discoloration. Due to excessive consumption of organic matter, the dissolved oxygen in water decreased drastically, which adversely affects the living environment of aquatic organisms, leading to a wide range of deaths.

The average length of tea stem fibers is 0.87 mm, while the average width is 0.017 mm, showing similarities to that of poplars. Compared with other high-quality pulping materials, the tea stem fibers are relatively thin and short, and the proportion of fine fibers (ranging between 0.15-0.5 mm) is higher, at an average of 32%. Macromolecules in the tea stem fiber are arranged neatly and densely, exhibiting a relatively high crystallinity and orientation. Due to the high content of hemicellulose, lignin and similar components, the tea stem fiber exhibits excellent paper plasticity and spinnability. As is the case with other crop stalks, tea waste contains a large amount of fiber, making it a highly pressing issue to find a way to apply it to papermaking or textile technologies.

SUMMARY OF THE INVENTION

In response to the issues present in the prior art, the invention provides a preparation method of tea residue fiber raw materials and its application. The entire preparation process is both low-pollution and low-energy consumption, and the tea residue products obtained can be decomposed, demonstrating high toughness, lightness, thinness, and sound absorption capabilities, thereby meeting the requirements for sustainable ecological resource material practice. The invention adopts the technical solution:

In the first aspect, the invention provides a method for preparing tea residue fiber raw materials, which comprises the following steps:

Step 1: Sun-drying the tea residues, crushing the sun-dried tea residues, blanching them with boiling water, adding water, then treating them with ultrasonic treatment for a period of time, treating them with concentrated hydrochloric acid at 50-60° C. for 1-2 h, filtering, washing to be neutral, treating with a sodium hydroxide alkali solution of mass concentration 20-25% at 70-80° C. for 4-5 h, filtering, and washing to be neutral;

Step 2: Extracting water from the treated tea residues to obtain tea polyphenols and pulp, respectively, cooking the pulp, and then pressing and dehydrating it to obtain coarse pulp;

Step 3: Sequentially grinding the coarse pulp and sieving it, followed by beating;

Step 4: After beating the pulp, adding β-Cyclodextrin, Carboxymethylcellulose Sodium and Reinforced Starch, adjusting the pH to 7-8, diluting it and then adding the tea polyphenols obtained in Step 2, mixing it uniformly, pressing and dehydrating it, and drying it to obtain the tea residue fiber raw materials.

Further, the tea residues comprise any one or any combination of tea stems, tea leaves, tea tailings, tea residues resulting from brewing, or defective products produced during a tea production process.

Further, the sieved residues obtained in the step 3 and the next batch of coarse pulp are subjected to simultaneous pulp grinding.

Further, the pulp beating degree in the step 3 is controlled to be between 30-40° SR.

Further, the total addition amount of the beta-cyclodextrin, the carboxymethylcellulose sodium, and the reinforced starch is 10-20% of absolute dry tea residue fiber raw materials, and the mass ratio of the beta-cyclodextrin to the carboxymethylcellulose sodium to the reinforced starch is 1 to (1-3) to (1-5).

In the second aspect, the invention provides another method for preparing tea residue fiber raw materials, which comprises the following steps:

Step 1: Sun-drying the tea residues, crushing the sun-dried tea residues, blanching them with boiling water, adding water, then treating them with ultrasonic treatment for a period of time, treating them with concentrated hydrochloric acid at 50-60° C. for 1-2 h, filtering, washing to be neutral, treating with a sodium hydroxide alkali solution of mass concentration 20-25% at 70-80° C. for 4-5 h, filtering, and washing to be neutral;

Step 2: adding a sodium alginate-gelatin solution to the treated tea residues and allowing them to stand at room temperature for a period of time; filtering and washing the filter cakes;

Step 3: adding distilled water to the filter cakes, shaking them for 30 min to 1 h, filtering them again, and drying them.

Further, the tea residues comprise any one or any combination of tea stems, tea leaves, tea tailings, tea residues resulting from brewing, or defective products produced during a tea production process.

Further, the mass concentration of sodium alginate in the sodium alginate-gelatin solution is in the range of 10-20%, while that of gelatin is 5-10%.

In the third aspect, the invention provides an application of tea residue raw materials to papermaking.

In the fourth aspect, the invention provides a method for preparing writing paper, comprising the steps of: treating the tea residue raw materials into a powder of 50-60 meshes, and uniformly mixing the powder with 10-20% by weight of bleached kraft softwood pulp and 90-80% by weight of ingredients, performing pulp grinding and pulp beating; papermaking and molding; squeezing and drying; and sequentially coiling, and splitting to obtain the writing paper.

Compared with the prior art, the preparation method has the advantages that chemical pulping is adopted, allowing substances such as starch and pectin to be hydrolyzed through acid treatment, thus increasing the yield of pulp. Moreover, acid treatment can facilitate the removal of certain sugars and other components, and prepare for subsequent alkali treatment. In order to highlight the properties of tea, a chemical treatment method is used in the papermaking process to appropriately maintain the texture of the tea leaf fiber. The tea residue paper prepared by the methods of the invention is light in color, fine in fiber, uniform in size, with a relatively robust structure, smooth and slightly dull to the touch, and boasting excellent water absorption, making it well-suited for writing.

DETAILED DESCRIPTION OF THE EMBODIMENTS

In the description of the invention, it should be noted that, unless otherwise specified in the embodiments, conventional conditions or conditions recommended by the manufacturer shall be adopted. Reagents or instruments employed are of conventional type and can be procured from the market.

The present invention is further described in detail below in combination with embodiments, to help those skilled in the art have a more complete, accurate, and in-depth understanding of the inventive concept and the technical solution of the invention. The scope of protection of the invention includes, but is not limited to, the following embodiments. Any modifications made to the details and form of the technical solution of the invention, without departing from the spirit and scope of the application, fall within the scope of protection of the invention.

The embodiments of the invention provide two methods for preparing tea residue fiber raw materials, as follows:

The first method for preparing tea residue fiber raw materials, comprising the following steps:
  Step 1: Sun-drying the tea residues, crushing the sun-dried tea residues, blanching them with boiling water, adding water, then treating them with ultrasonic treatment for a period of time, treating them with concentrated hydrochloric acid at 55° C. for 2 h, filtering, washing to be neutral, treating with a sodium hydroxide alkali solution of mass concentration 20% at 75° C. for 4 h, filtering, and washing to be neutral; the tea residues comprise any one or any combination of tea stems, tea leaves, tea tailings, tea residues resulting from brewing, or defective products produced during a tea production;
  Step 2: Extracting water from the treated tea residues to obtain tea polyphenols and pulp, respectively, cooking the pulp, and then pressing and dehydrating it to obtain coarse pulp;
  Step 3: Sequentially grinding the coarse pulp and sieving it, followed by beating, wherein the pulp beating degree is controlled to be 30-40° SR;
  Step 4: adding β-cyclodextrin, carboxymethylcellulose sodium, and reinforced starch after the beating, wherein the total addition amount of the beta-cyclodextrin, the carboxymethylcellulose sodium, and the reinforced starch is 20% of absolute dry tea residue fiber raw materials, and the mass ratio of the beta-cyclodextrin to the carboxymethylcellulose sodium to the reinforced starch is 1 to 2 to 5; adjusting pH to 8, diluting, adding the tea polyphenols obtained in the second step, stirring uniformly, pressing and dehydrating, and drying to obtain the tea residue fiber raw material.

In the process, the sieved residues obtained in the step 3 and the next batch of coarse pulp are subjected to simultaneous pulp grinding.

The second method for preparing tea residue fiber raw materials, comprising the following steps:
  Step 1: Sun-drying the tea residues, crushing the sun-dried tea residues, blanching them with boiling water, adding water, then treating them with ultrasonic treatment for a period of time, treating them with concentrated hydrochloric acid at 55° C. for 2 h, filtering, washing to be neutral, treating with a sodium hydroxide alkali solution of mass concentration 20% at 75° C. for 4 h, filtering, and washing to be neutral; the tea residues comprise any one or any combination of tea stems, tea leaves, tea tailings, tea residues resulting from brewing, or defective products produced during a tea production;
  Step 2: adding a sodium alginate-gelatin solution to the treated tea residues and allowing them to stand at room temperature for a period of time; filtering and washing the filter cakes; the mass concentration of sodium alginate in the sodium alginate-gelatin solution is in the range of 10%, while that of gelatin is 5%;
  Step 3: adding distilled water to the filter cakes, shaking them for 30 min; filtering them again, and drying them.

The embodiments of the invention provide a method for preparing writing paper, comprising the steps of: treating the tea residue raw materials into a powder of 50-60 meshes, and uniformly mixing the powder with 10-20% by weight of bleached kraft softwood pulp and 90-80% by weight of ingredients, performing pulp grinding and pulp beating; papermaking and molding; squeezing and drying; and sequentially coiling, and splitting to obtain the writing paper. The papermaking and molding process is performed in accordance with established processes, which will not be described in detail herein.

Embodiment 1

The embodiment adopts the first preparation method of tea residue fiber raw materials. The percentage by weight of the tea residue raw materials used for papermaking to the bleached kraft softwood pulp ranges from 10% to 90%.

Technical indicators of tea residue paper in Embodiment 1 are shown as following: Color: light; Fiber: fine; Edge: uniform; Toughness: firm; Touch: smooth; Water absorption: slightly dull; and Writing: good for writing.

Embodiment 2

The embodiment adopts the first preparation method of tea residue fiber raw materials. The percentage by weight of the tea residue raw materials used for papermaking to the bleached kraft softwood pulp ranges from 20% to 80%.

Technical indicators of tea residue paper in Embodiment 2 are shown as following: Color: light; Fiber: fine; Edge: uniform; Toughness: firm; Touch: smooth; Water absorption: slightly dull; and Writing: good for writing.

Embodiment 3

The embodiment adopts the second preparation method of tea residue fiber raw materials. The percentage by weight of the tea residue raw materials used for papermaking to the bleached kraft softwood pulp ranges from 10% to 90%.

Technical indicators of tea residue paper in Embodiment 3 are shown as following: Color: slightly deep; Fiber: finer; Edge: slightly wrinkled; Toughness: tougher; Touch: smoother; Water absorption: slightly dull; and Writing: better for writing.

Embodiment 4

The embodiment adopts the second preparation method of tea residue fiber raw materials. The percentage by weight of the tea residue raw materials used for papermaking to the bleached kraft softwood pulp ranges from 20% to 80%.

Technical indicators of tea residue paper in Embodiment 3 are shown as following: Color: slightly deep; Fiber: finer; Edge: slightly wrinkled; Toughness: slightly brittle; Touch: smoother; Water absorption: slightly dull; and Writing: better for writing.

The above embodiments are merely illustrative of several implementations of the invention, and the description thereof is more specific and detailed. However, these embodiments may not be construed as a limitation to the patentable scope of the invention. It should be pointed out that several variations and improvements may be made by those of ordinary skill in the art without departing from the conception of the invention, but such variations and improvements should fall within the protection scope of the invention. Therefore, the scope of protection of the invention patent should be subjected to the appended claims.

What is claimed is:

1. A method for preparing tea residue fiber raw materials for papermaking, comprising steps of:
    Step 1: adding a sodium alginate-gelatin solution to tea residues to form a first mixture and allowing the first mixture to stand at room temperature for a period of time to form a room temperature first mixture; filtering the room temperature first mixture to form a first set of filter cakes and washing the first set of filter cakes to form washed filter cakes; and
    Step 2: adding distilled water to the washed filter cakes to form a second mixture, shaking the second mixture for 30 minutes to 1 hour to form a shaken mixture, filtering the shaken mixture to form a second set of filter cakes, and drying the second set of filter cakes,
    wherein the tea residues comprise any one or any combination of tea stems, tea leaves, tea tailings, tea residues resulting from brewing, or any defective products produced during a tea production process.

2. A method for preparing tea residue fiber raw materials for papermaking of claim 1, wherein the mass concentration of sodium alginate in the sodium alginate-gelatin solution is 10-20%, and the mass concentration of gelatin is 5-10%.

* * * * *